United States Patent [19]

Molyneux

[11] Patent Number: 5,382,480
[45] Date of Patent: Jan. 17, 1995

[54] BATTERY TERMINALS

[75] Inventor: John Molyneux, Runcorn, United Kingdom

[73] Assignee: Silent Power GmbH Fur Energiespeichertechnik, Germany

[21] Appl. No.: 971,757

[22] PCT Filed: Feb. 20, 1992

[86] PCT No.: PCT/GB91/10346
§ 371 Date: Feb. 5, 1993
§ 102(e) Date: Feb. 5, 1993

[87] PCT Pub. No.: WO92/02963
PCT Pub. Date: Feb. 20, 1992

[30] Foreign Application Priority Data

Aug. 7, 1990 [GB] United Kingdom ............... 9017310

[51] Int. Cl.6 ........................................... H01M 10/50
[52] U.S. Cl. ........................................ 429/120; 429/183
[58] Field of Search ...................... 429/120, 179, 183

[56] References Cited

U.S. PATENT DOCUMENTS

| 3,758,337 | 9/1973 | Fally et al. |
| 4,443,524 | 4/1984 | Meinhold et al. ........... 429/120 X |
| 4,585,712 | 4/1986 | Wedlake ....................... 429/120 X |
| 4,600,665 | 7/1986 | Sanders ........................... 429/120 |
| 5,034,290 | 7/1991 | Sands et al. ................... 429/120 |

FOREIGN PATENT DOCUMENTS

| 717389 | 2/1942 | Germany . |
| 2514508A1 | 10/1976 | Germany . |
| 776240 | 6/1957 | United Kingdom . |
| 1499306 | 2/1978 | United Kingdom . |
| WO89/10011 | 10/1989 | WIPO . |

Primary Examiner—Stephen Kalafut
Attorney, Agent, or Firm—Finnegan, Henderson, Farabow, Garrett & Dunner

[57] ABSTRACT

A battery terminal comprises a thermally and electrically conductive bar. Means are provided to connect one end of the bar to an electrical cable and the other end of the bar to cells of the battery. The bar leads out through a battery casing and heat dissipating means fastened to the battery casing. The heat dissipating means are in good thermal contact with and electrically insulated from the lead out bar.

11 Claims, 6 Drawing Sheets

BATTERY TERMINALS

This invention relates to battery terminals, and in particular to a rigid connection between the battery cells leading out from the casing and heat dissipating means attached to the outside of the battery casing.

Many forms of battery are known, from a single cell, to arrangements comprising a plurality of interconnected cells as necessary to give a required energy storage capacity.

Batteries can also be divided into two main types; primary batteries which have a relatively short life and which are discarded when exhausted, such batteries often being a single cell and used for torches, radios and toys; and secondary batteries which are rechargable when exhausted and thus have a relatively long life, such batteries being used for starting automobiles, powering fork lift trucks and electric vehicles, and providing standby power for buildings and telephone exchange equipment.

Both primary and secondary batteries of dry alkaline type are known, as are secondary batteries of lead acid type.

Recently secondary batteries of sodium sulphur type have become known, such batteries having the advantages of light weight, high storage capacity and relatively quick recharging time. Further, such batteries use sodium and sulphur both of which are cheap and abundant materials.

Unlike conventional lead acid batteries in which a liquid electrolyte - dilute sulphuric acid separates two solid electrodes, in a sodium sulphur battery a solid electrolyte - beta alumina -separates two liquid electrodes, namely liquid sulphur and sodium electrodes.

Such a sodium sulphur cell is shown in FIG. 1 of the drawings, which is a perspective view of the cell with part broken away.

As shown the cell comprises a pressed steel case 1 in the form of a right circular cylinder containing a solid electrolyte cup 2 of beta alumina, the cup 2 containing a sodium electrode 3, while a space between the case 1 and the cup 2 contains a sulphur electrode 4. For use, the cell is maintained at a temperature of about 350° C. such that the sodium and sulphur electrodes 3 and 4 are in liquid form.

The open end of the cup 2 is closed by an insulating disc 5 of alpha alumina, while the case 1 is closed by an annular steel disc 6.

The case 1 serves as a terminal for the sulphur electrode 4, while the sodium electrode 3 contains an elongate metal current collector 8 which extends axially of the case 1 out through the disc 5 where it is connected to a centre terminal disc 7 mounted on the disc 5, the necessary connections being made by welding.

The atomic structure of beta alumina is such that it acts as a selective ion filter. When the cell is discharging sodium ions pass from the sodium electrode 3 through the electrolyte 2 to react with the sulphur electrode 4 to form sodium sulphide. The chemical energy of this reaction is converted directly to electrical energy.

When the cell is charged, sodium and sulphur are regenerated from the sodium sulphide, the input electrical energy being converted into chemical energy.

To provide a battery capable of powering a vehicle it may be necessary for about 3000 cells as described above to be assembled together in arrays of series-connected arrangements of cells, the arrangements in each array being connected in parallel, and the arrays of arrangements being connected in series.

The cells forming the battery are enclosed in a heat insulating box which keeps the cells hot when no power is being drawn therefrom. Problems arise with the power leads which provide means for establishing connections to the terminals of the battery.

Batteries as under consideration are capable of giving high power output, and thus the leads connected thereto must be of a substantial diameter, say 6 mm. Due to the necessary size of such leads, i.e. their cross section, for them to serve their electrical function, they also provide good paths for heat to be conducted out of the battery. Such thermal conduction along the external cables can cause severe damage to the electrical insulation from the cable and associated dangers.

According to one aspect of the invention there is provided a battery terminal comprising a thermally and electrically conductive bar having means to connect it at one end to an electrical cable and at its other end to cells of the battery, said bar leading out through a battery casing and heat dissipating means fastened to said battery casing in good thermal contact with and electrically insulated from said lead out bar.

According to another aspect of the invention the heat dissipating means comprise a battery terminal in which the heat dissipating means comprise a first collar located on said lead out bar in good thermal contact therewith.

According to yet another aspect of the invention the first collar has a screw thread in which the first collar has a screw thread on an inner surface which cooperates with a screw thread on an outer surface of the lead out bar.

According to a further aspect of the invention the heat dissipating means comprise a battery terminal in which the heat dissipating means further comprise a second collar in good terminal contact with said first collar and a layer of electrically insulating material located therebetween.

An alternative aspect of the invention provides that the second collar at the plurality in which the second collar has a plurality of heat dissipating fins on an external surface thereof.

According to yet a further aspect of the invention the heat dissipating means further comprise a cap positioned over the end of the lead out bar.

According to another aspect of the invention the cap is fastened to the second collar.

According to the further aspect of the invention the lead out bar is stainless steel, the first collar may be of copper, the second collar may be of aluminium and the cap may be of aluminium. Electrically insulating layer may also be of mica.

There will now be described by way of example only one embodiment of the invention with reference to the accompanying drawings in which.

Figure 1:
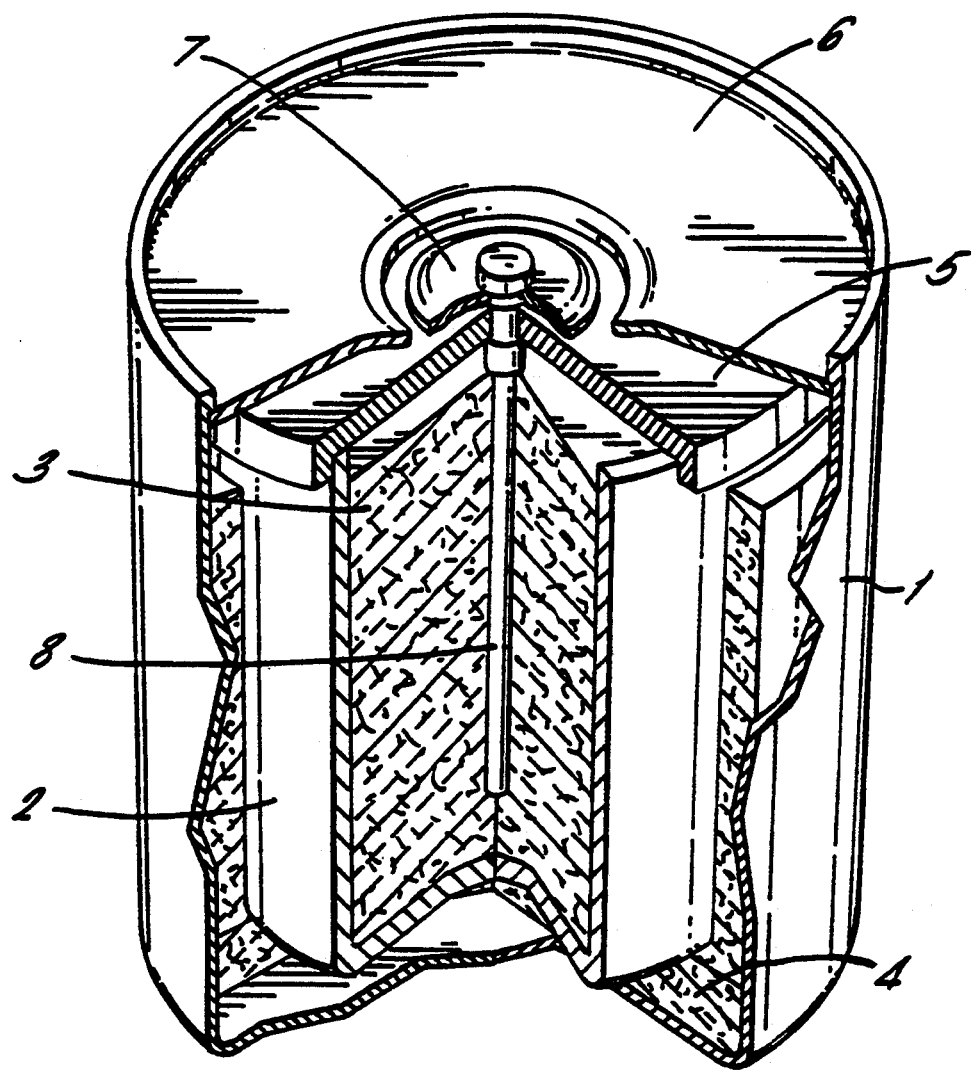
FIG. 1 is a perspective view of a typical sodium sulphur cell with part broken away.
Figure 2:
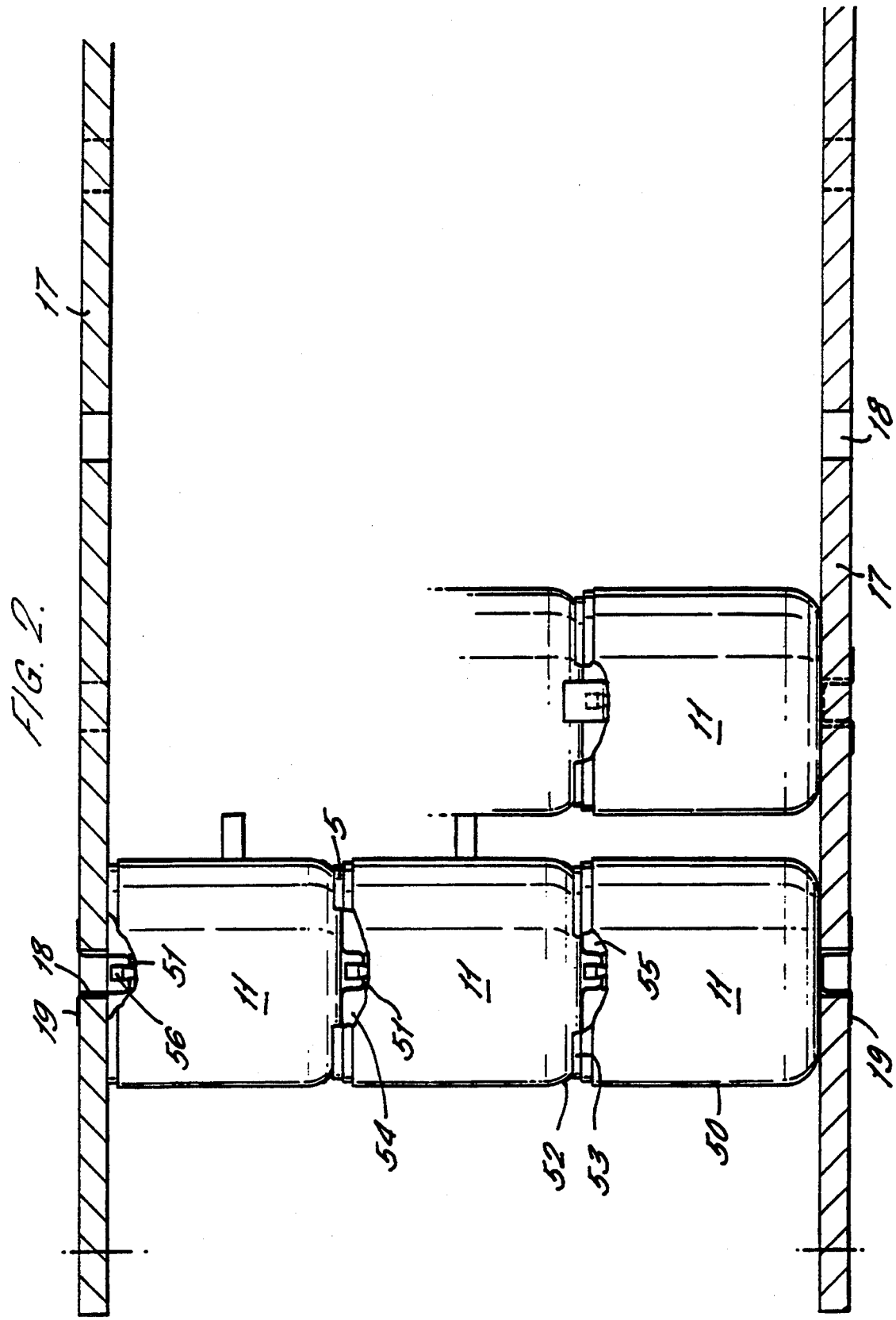
FIG. 2 is a battery comprising a plurality of series arrangements of cells arranged between a pair of bus plates.

The battery shown in FIG. 2 comprises a plurality of series of arrangements each of three cells 11 connected in end to end arrangement. Each cell 11 has a cylindrical case 50 constituting one terminal and a centre terminal disc 51 at one end of the case 50 constituting the other terminal. The cells 11 are arranged end to end with the centre terminal disc 51 of the lower cell adjacent the bottom surface 52 of the upper cell with an annular space member 53 of insulating ceramic or porcelain material interposed between them. The spacing member 53 served to prevent contact between the cases 50 of the adjacent cells 11. A strip 54 of conductive metal extends across the bottom surface 52 of the upper cell 11 and is welded thereto at the free ends of the strip 54. At its centre the strip is formed to extend downwardly through an aperture 55 in the spacing member 53 to engage over the current collector 56 of the cell 11 beneath it and be welded to the centre terminal disc 51 of that cell 11. The strip 54 thus provides the necessary connection between the centre terminal disc 51 of the lower cell 11 and the case 50 of the upper cell 11. The annular spacing member 53 prevents direct contact between the cases 50 of the two adjacent cells 11.

The end terminal of each series arrangement is connected to the adjacent bus plate 17 by means of a conductive metal strip 19 welded to the terminal 51 and having the free ends passing through an aperture 18 in the bus plate 17 and welded to the side of the bus plate 17 remote from the terminal.

Figure 3:
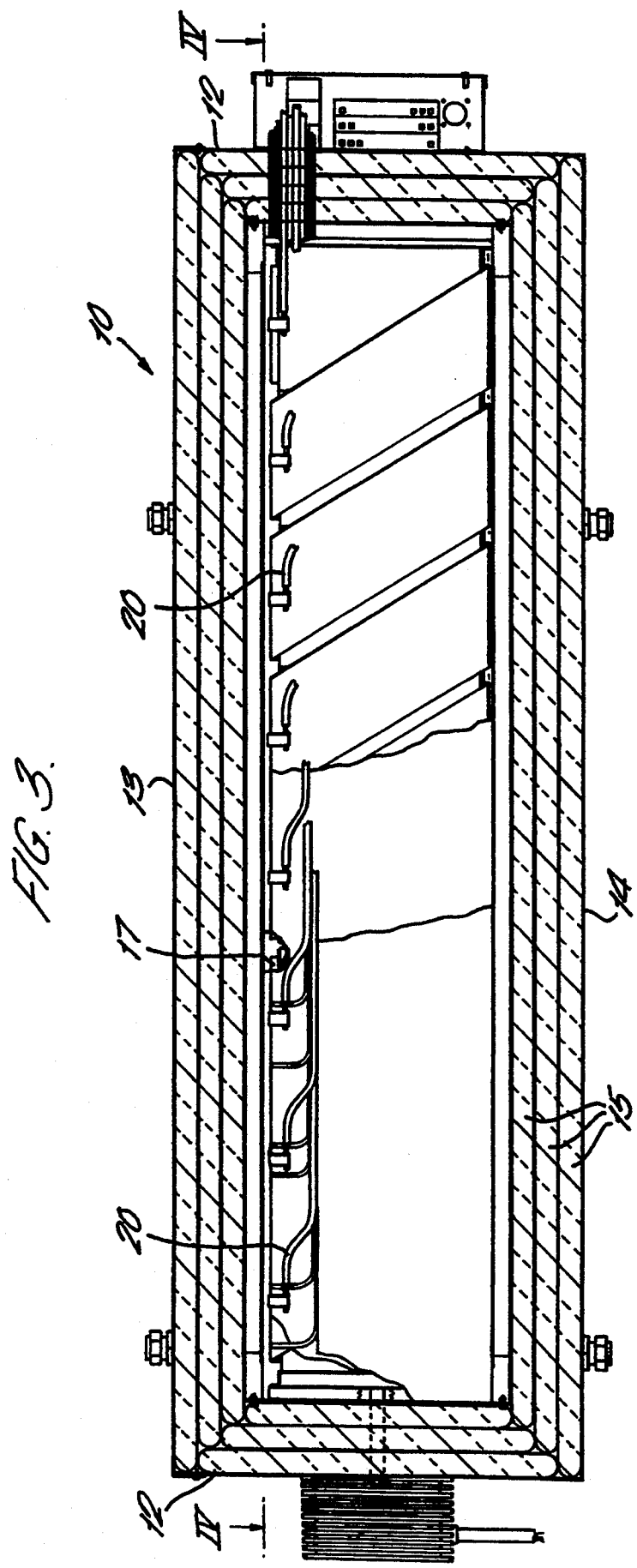
FIG. 3 is a sectional side elevation of a battery box containing a plurality of cells on the line III—III of FIG. 4.
Figure 4:
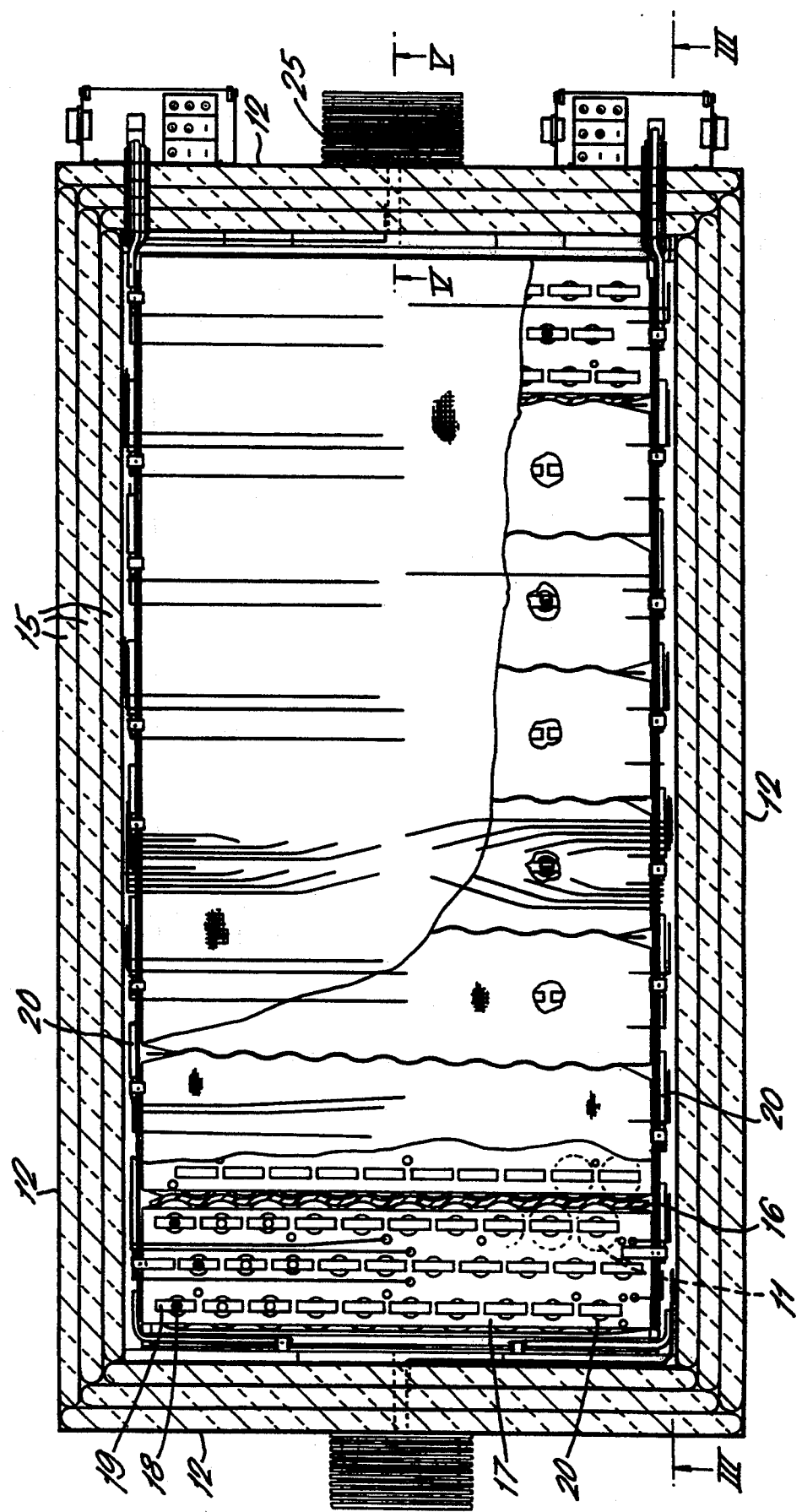
FIG. 4 is a plan sectional view of the battery box of FIG. 3 on the line IV—IV.

Referring now to FIGS. 3 and 4 there is shown in detail a battery box 10 which contains a plurality of sodium sulphur cells 11. The box 10 comprises four side walls 12, an upper wall 13 and a lower wall 14. The walls 12, 13, 14 are made from two plates of stainless steel spaced apart and containing three layers of thermally insulating material 15. Within the box 10 there are eight banks of cells 11 separated by a layer 16 of electrically insulating material.

Figure 5:
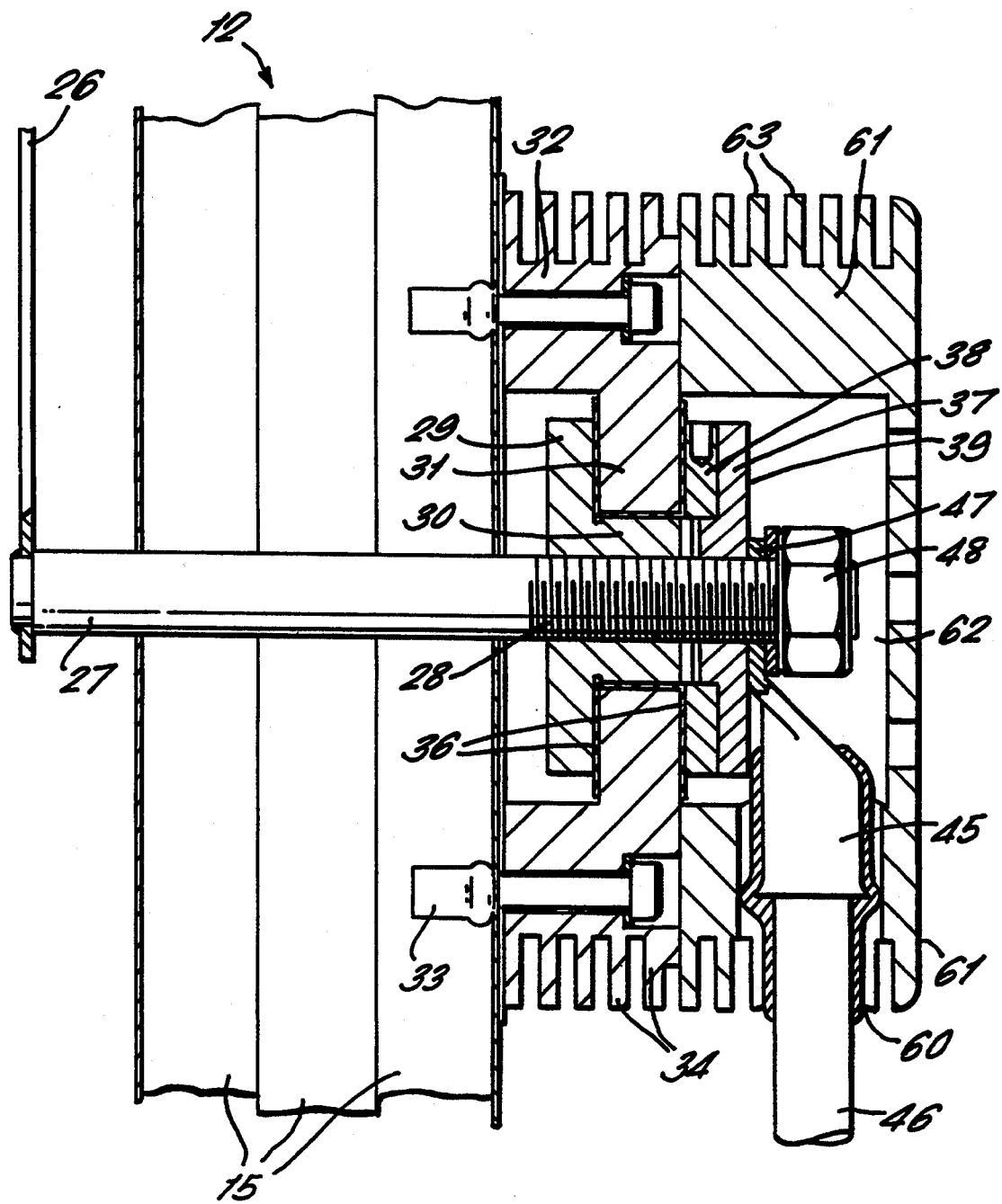
FIG. 5 is an enlarged part section of a negative lead out from the battery box of FIG. 2 on the line V—V of FIG. 4.

Each bank of cells 11 has an electrical lead 20 connected at each end thereof arranged to lead to the negative lead out 25 from the casing 12 via bank plate, shown in FIG. 5. Connected to the bank plate 26 is one end of a stainless steel lead through bar 27 which is threaded at its opposite end 28. The lead through bar 27 penetrates the side wall 15 and all its constituting layers so as to "lead out" from the battery casing. Located on the threaded end 28 of the bar 27 which projects beyond the side wall 15 is a copper bobbin 29 which has a flange and a stepped portion 30. An aluminium collar 32 having a flange 31 on its inner surface is fitted over the stepped portion 30 and fastened to the outer steel plate of the casing side wall 12 so that the flange 31 holds the collar 32 in position. The fastenings may comprise a nut 33 and bolt arrangement as shown or any other suitable means.

The outer surface of the collar 32 has a plurality of fins 34 which assist heat loss. Positioned between the collar flange 31 and the bobbin stepped portion 30 is a layer 36 of thermally conductive and electrically insulating material such as FILAMIC (Trade Mark). FILAMIC is a paperlike material of 100% natural mica in continuous rolls. The paper is formed from myriads of tiny platelets of natural mica. The platelets are formed from carefully cleaned natural block mica in both muscovite (clear) and phlogopite (amber) forms by a special process in which neither heat nor chemical reactions are employed. This ensures that the mica retains its natural physical form. The tiny platelets are laid together by allowing them to settle under gravity in pure water so that the paper is formed with a great degree of homogeneity and with consisent density, electrical and physical properties. FILAMIC foils are impregnated with a wide variety of resins and the foils are laminated together under heat and pressure to form rigid sheets and other forms. These products are excellent and very stable electrical and mechanical characteristics, depending on the type of resin selected. One of the more suitable sheets for use with the invention is one in the thickness range 0.1-25 mm having silicone bond and the operating temperature in between 600°-800° C.

A copper nut 37 is then screwed onto the lead through bar 27 with a pressure washer 38 sandwiched between a flange 39 of the nut and the inner flange 31 portion 40 of the aluminium collar 32. The electrical insulation and thermally conducting layer 36 also covers the surface of a collar flange 31 adjacent the pressure washer 38.

Figure 6:
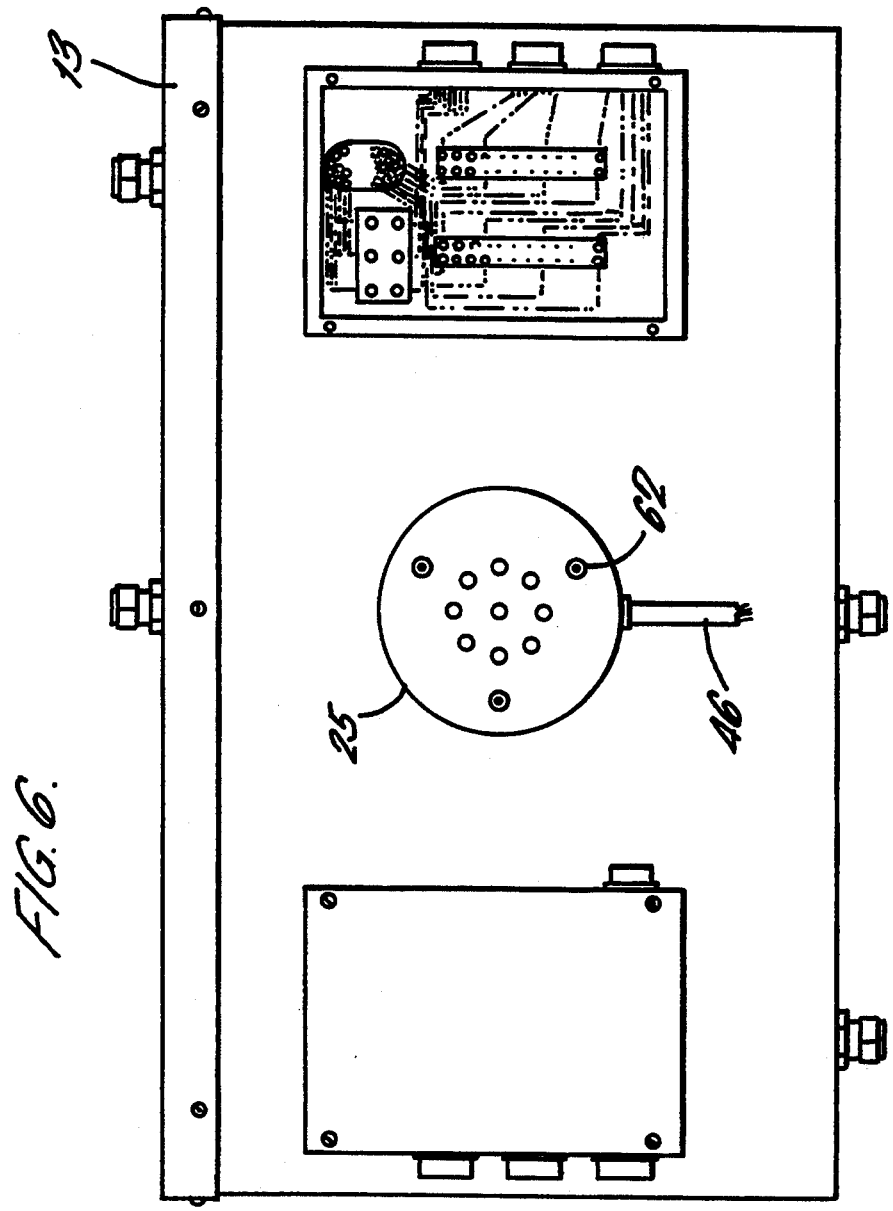
FIG. 6 is an end view of the battery box of FIG. 3 of the right hand end.

The main lead out cable 46 is connected to the lead out bar 27 by means of a connector 45. The connector 45 has a flattened portion 47 having an aperture therein which fits over the lead out bar 27 and is retained against the outer surface of the copper nut 37 by means of a nut 48 to complete the electrical connection between the cells 11 and the cable 46. The lead out cable 46 passes through an aperture 60 in an aluminium cap 61 which is fastened by studs or other suitable means to the aluminium collar 32. The cap 61 has a hollowed out portion 62 which encloses the copper nut 37 and the nut 48 on the end of the lead out bar 27. The outer surface of the aluminium cap 61 has a plurality of fins 63 similar to those on the aluminium collar 32 which assist heat loss. FIG. 6 shows an end view of the battery box with the lead out 25.

In use, heat from the battery passes along the lead out stud 27, into the copper bobbin 29, the aluminium collar 32 and the aluminium cap 61 whereby the fins 34 and 63 assist in its dissipation to the surrounding air. This prevents the heat from reaching the lead out cable 46 where it can cause damage to the surrounding insulation. The electrical insulation 36 prevents the electric current from also being dissipated to maximise the output of the battery.

I claim:

1. A battery terminal comprising a thermally and electrically conductive bar having means to connect it at one end to an electrical cable and at its other end to cells of the battery, said bar leading out through a battery casing, and means for dissipating heat fastened to said battery casing in thermal contact with and electrically insulated from said lead out bar, said heat dissipating means including a first collar in thermal contact with said lead out bar and a layer of electrically insulating material located therebetween.

2. A battery terminal as claimed in claim 1 further comprising a second collar located on said lead out bar and fastened to the battery casing so as to retain said first collar in position on the lead out bar.

3. A battery terminal as claimed in claim 1 in which said first collar has a plurality of heat dissipating fins on an external surface thereof.

4. A battery terminal as claimed in claim 1 in which the heat dissipating means further comprises a cap positioned over one of the ends of the lead out bar.

5. A battery terminal as claimed in claim 4 in which the cap is fastened to said first collar.

6. A battery terminal as claimed in claim 3 in which the heat dissipating means further comprises a cap positioned over one of the ends of the lead out bar.

7. A battery terminal as claimed in any one of claims 1, 2-5 and 6 in which said lead out bar is stainless steel.

8. A battery terminal as claimed in any one of claims 2-5 and 6 in which the first collar is of aluminum.

9. A battery terminal as claimed in any one of claims 2-5 and 6 in which the second collar is of copper.

10. A battery terminal as claimed in any one of claims 2-5 and 6 in which the electrically insulating layer is of mica.

11. A battery terminal as claimed in any of claims 4-5 and 6 in which the cap is of aluminum.

* * * * *

UNITED STATES PATENT AND TRADEMARK OFFICE
CERTIFICATE OF CORRECTION

PATENT NO. : 5,382,480
DATED : January 17, 1995
INVENTOR(S) : John Molyneux

It is certified that error appears in the above-indentified patent and that said Letters Patent is hereby corrected as shown below:

Title page, item [86], change "PCT No.: PCT/GB91/10346" to read--
PCT No.: PCT/GB91/01346--.

Signed and Sealed this

Twenty-eight Day of March, 1995

Attest:

BRUCE LEHMAN

*Attesting Officer*　　　　*Commissioner of Patents and Trademarks*